US006882721B2

United States Patent
Mikhailov et al.

(10) Patent No.: US 6,882,721 B2
(45) Date of Patent: Apr. 19, 2005

(54) METHOD AND APPARATUS ENABLING LOCAL NUMBER PORTABILITY IN TELEPHONE NETWORKS

(75) Inventors: Vladimir V. Mikhailov, Nepean (CA); Michael M. Gawargy, Nepean (CA); Christian C. Constantinof, Kanata (CA)

(73) Assignee: Nortel Networks Limited, St. Laurent (CA)

( * ) Notice: Subject to any disclaimer, the term of this patent is extended or adjusted under 35 U.S.C. 154(b) by 447 days.

(21) Appl. No.: 09/745,423

(22) Filed: Dec. 26, 2000

(65) Prior Publication Data

US 2002/0080947 A1 Jun. 27, 2002

(51) Int. Cl.[7] .................................................. H04M 3/00
(52) U.S. Cl. ................... 379/221.13; 379/219; 379/230
(58) Field of Search ....................... 379/221.13, 221.08, 379/219, 229, 230, 142.01, 201.01, 220.01

(56) References Cited

U.S. PATENT DOCUMENTS

| | | | |
|---|---|---|---|
| 5,598,464 A | 1/1997 | Hess et al. ................... | 379/213 |
| 5,867,569 A | 2/1999 | Martinez et al. ............ | 379/207 |
| 5,905,724 A | 5/1999 | Carson et al. ............... | 370/385 |
| 5,949,870 A | 9/1999 | Hayduk et al. .............. | 379/221 |
| 6,002,759 A | 12/1999 | Kallioniemi et al. ........ | 379/220 |
| 6,252,952 B1 * | 6/2001 | Kung et al. ................... | 37/114 |
| 6,373,817 B1 * | 4/2002 | Kung et al. ................... | 370/17 |
| 6,389,130 B1 * | 5/2002 | Shenoda et al. ........ | 379/221.08 |

* cited by examiner

Primary Examiner—William J. Deane, Jr.
(74) Attorney, Agent, or Firm—Max R. Wood; Ogilvy Renault

(57) ABSTRACT

A method for providing local number portability between subscriber lines served by a distributed switch call manager (DSCM) involves updating translation tables of the DSCM to direct call control messages to a media gateway (MG) that serves the ported number. The service features and service feature profile of the ported subscriber are ported concurrently with the directory number, without re-provisioning.

13 Claims, 5 Drawing Sheets

METHOD AND APPARATUS ENABLING LOCAL NUMBER PORTABILITY IN TELEPHONE NETWORKS

CROSS-REFERENCE TO RELATED APPLICATIONS

This is the first application filed for the present invention.

MICROFICHE APPENDIX

Not applicable.

TECHNICAL FIELD

The present invention relates to the provision of service features in a switched telephone network and, in particular, to the enabling of local number portability for telephone service subscribers.

BACKGROUND OF THE INVENTION

Local number portability (LNP) is a service feature for telephone service subscribers that permits a subscriber to retain his/her telephone number while relocating from one subscriber line to another within a local toll area. A problem associated with enabling LNP involves efficiently directing calls to a ported subscriber's new line, which is connected to a Central Office that is not provisioned to serve the ported directory number. A second problem involves the retention of the subscriber's service features throughout the porting process without interruption and/or extensive re-provisioning, and without losing feature continuity.

Many prior art solutions have been proposed to address the problem of how to provide LNP to telephone service subscribers. A few of these are briefly discussed following a description of the telecommunications network in which they are designed to be implemented.

Legacy switched telecommunications networks, as schematically illustrated in FIG. 1 and familiar to those skilled in the art, include Central Offices 10 equipped with Time division multiplexed (TDM) switches 11 that transmit multiple streams of pulse code modulated (PCM) data across a circuit-switched bearer network generally referred to as the public switched telephone network (PSTN) 18. The TDM switches 11 include a central processing unit (CPU), generally referred to as a "Control Module" (CM) 16, a plurality of line interfaces (LIs) 22, a switch fabric 34, and a plurality of digital trunk controllers (DTCs) 30. As is well understood by those skilled in the art, other peripherals may also be supported by the TDM switches 11.

The plurality of LIs 22 are TDM switch peripherals that provide interfaces between subscriber lines 15 and the TDM switches 11. Lis 22 include such devices as line carrier modules (LCMs), well known in the art. Each of the plurality of DTCs 30 are likewise TDM switch peripherals that provide interfaces for inter-switch trunks 19 that interconnect the TDM switches 11. Trunks 19 are devices such as T1 and E1 facilities, also well known in the art.

The CM 16 of a TDM switch 11 controls a connection through the switch fabric 34, between two TDM switch peripherals. The CM 16 is also responsible for call control messaging via a common channel signaling (CCS) network 20. The call control messaging is used to coordinate actions of TDM switches 11 to establish call connection between two subscribers.

The common channel signaling (CCS) network 20 delivers call control messages involved in the set-up, tear-down, and monitoring of call connections. In North America, signaling system 7 (SS7) is generally used for call control messaging. The CCS network 20 routes call control messages between CMs 16 of different TDM switches 11 to control inter-switch calls.

As noted above, several methods for enabling LNP have been proposed. In several prior art methods for providing LNP, ported directory numbers are stored in a database 24 with routing instructions for completing calls to a current location of equipment serving the numbers such as a ported directory number shown at 14. This solution is typified by U.S. Pat. Nos. 5,867,569; 5,598,464; 5,905,724; and 5,949,870. The LNP database 24 may be any network element or subnetwork element of the CCS network 20 that is accessed to retrieve LNP routing information related to subscribers who have ported directory numbers. The LNP database 24 could therefore be a Service Control Point (SCP), a memory associated with a Central Office, or an Intelligent Network (IN) or Advanced Intelligent Network (AIN) device. The content of the LNP database 24 is used to direct call control messages to network switching equipment that serves a ported subscriber's line.

The public switched telephone network (PSTN) is currently in transition and moving toward the use of high-bandwidth broadband networks for performing bearer transport, to augment the circuit-switched PSTN. Broadband networks emulate circuit-switched bearer networks by providing virtual trunking for calls. One example of a new switched telecommunications network configuration using a broadband bearer network is described in Applicant's co-pending U.S. patent application Ser. No. 09/702,776, which was filed on Nov. 1, 2000 and entitled DISTRIBUTED TELEPHONE SERVICE SWITCH AND METHOD OF USING SAME.

Although advances in network technology have been made, none of the known proposals for LNP are ideal, and all known proposals fail to capitalize on new possibilities enabled by the introduction of broadband bearer networks into the PSTN.

There therefore exists a need for an LNP solution that capitalizes on the routing flexibility introduced into the PSTN by the implementation of broadband transport networks for inter-switch trunking.

SUMMARY OF THE INVENTION

An object of the present invention is to provide a method of porting directory numbers within a local telephone service area served by a distributed telephone service switch.

Another object of the present invention is to expand the area within which a telephone service subscriber served by a distributed switch call manager (DSCM) is enabled to port.

A further object of the present invention is to enable the subscriber's service feature profile and content to be ported concurrently with the porting of the subscriber's directory number.

Accordingly a method of porting directory numbers within a local telephone service area is disclosed. Also disclosed is a method of extending the area within which a telephone service subscriber, served by a distributed switch call manager (DSCM), is enabled to port. Porting a telephone service subscriber in accordance with the present invention, involves concurrently porting service features.

Telephone service subscriber lines served by a distributed switch call manager (DSCM) may be served using a number of geographically dispersed media and line gateways (MGs and LGs). In each case signaling paths between these MGs and LGs and the DSCM are established. If a subscriber served by the DSCM relocates to an area served by the DSCM using a different MG or LG, porting the subscriber's directory number involves re-provisioning the DSCM to address call control messages associated with the ported number to the different MG or LG.

If the telephone service subscriber relocates to an area served by one or more other DSCMs, the porting of the subscriber's directory number can be effected by an additional step of establishing a signaling path between the DSCM and a new MG or LG installed in that area.

Local number portability is further facilitated by provisioning MGs and LGs adapted to communicate with more than one DSCM, and to discriminate directory numbers.

The present invention requires no rerouting of signaling messages, and no database searches. As a result, it does not contribute to call setup delay, or require any AIN infrastructure. Further, except in a case in which a telephone service subscriber relocates to a place where no available subscriber line is served by the DSCM, porting the subscriber's directory number requires only a modification to translation tables in the DSCM.

A significant advantage of this method is that all of the service features, including messaging features, are ported with the number, without interruption or loss of continuity.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION OF THE PREFERRED EMBODIMENT

The invention provides a method and apparatus for enabling local number portability within an area served by at least one distributed switch call manager (DSCM) described in Applicant's co-pending patent application Ser. No. 09/702,776 referenced above, the specification of which is incorporated herein by reference. LNP is enabled in a distributed switch by re-provisioning directory number translations used by the DSCM to associate the ported directory number with a media gateway (MG) that serves the ported directory number. LNP is enabled between distributed switches by provisioning a new MG in the distributed switch to which the numbers are to be ported, and re-provisioning a DSCM that served the directory numbers before they were ported with directory number translation tables used by the DSCM to associate the ported directory number with the new MG. LNP is further facilitated by provisioning an MG to address one DSCM for control messaging related to unported directory numbers and another DSCM for control messaging related to ported directory numbers.

Figure 1:
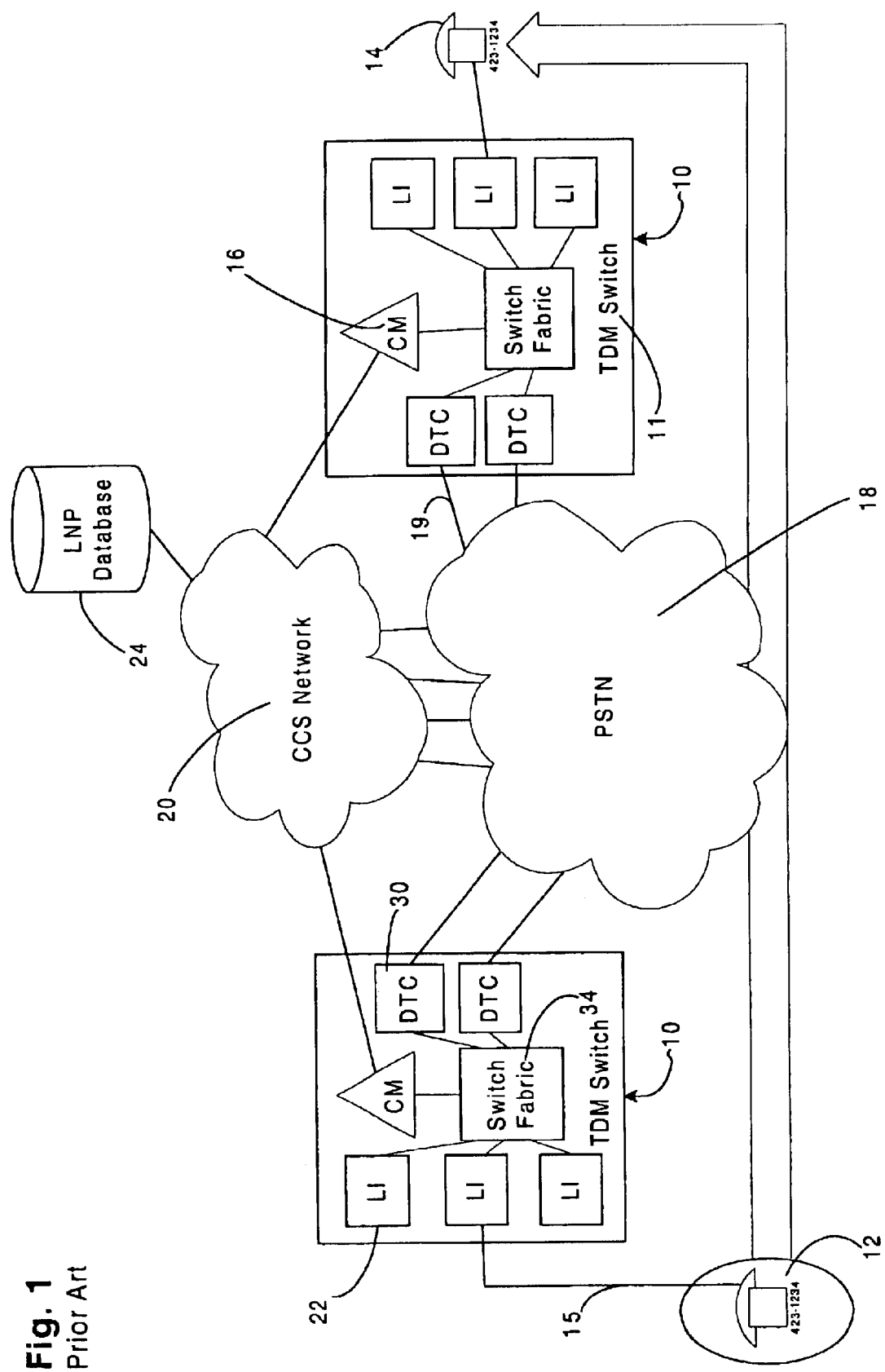
FIG. 1 is a schematic diagram of a prior art switched telephone network, featuring an apparatus used in several prior art methods for providing LNP.
Figure 2:
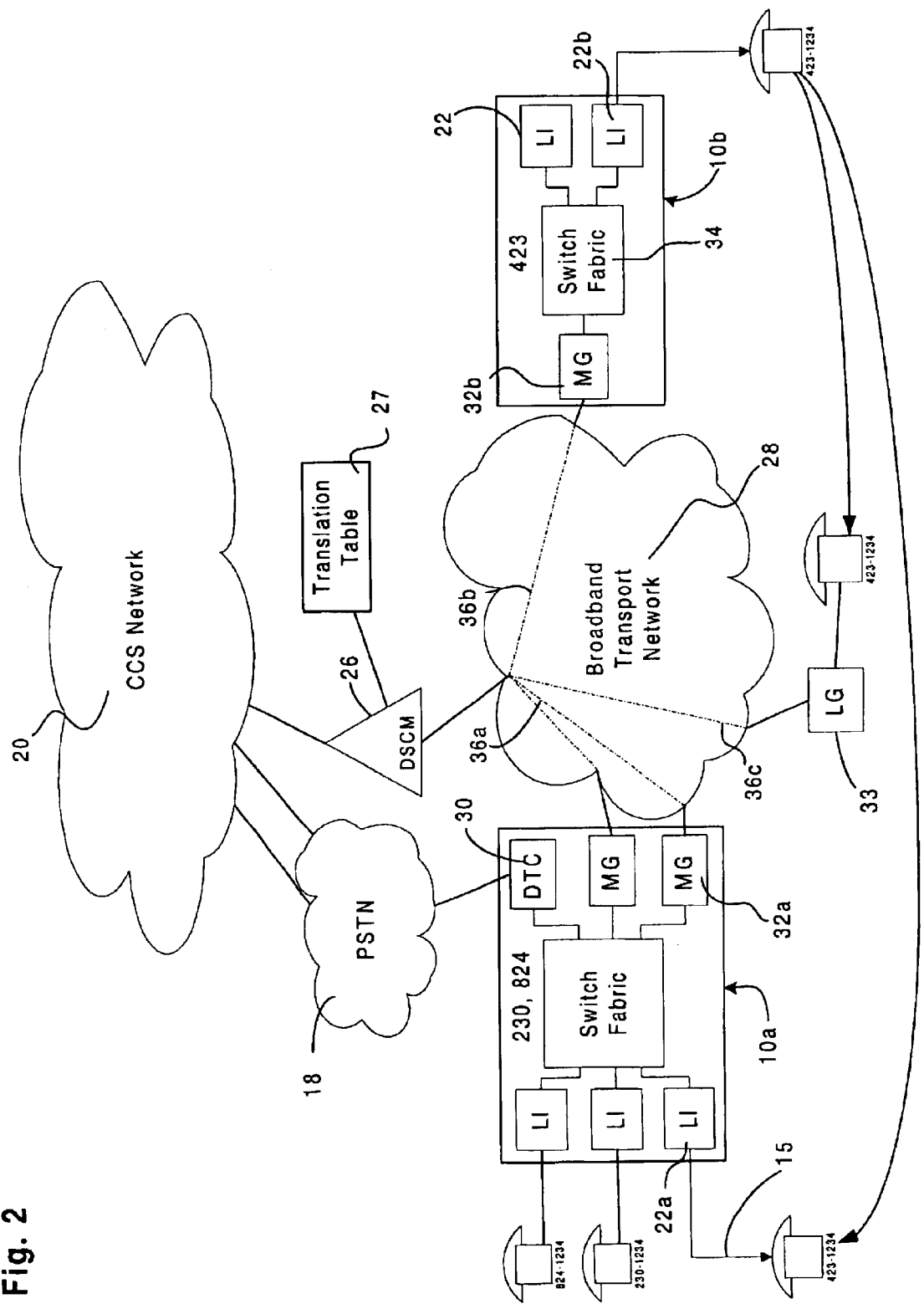
FIG. 2 depicts a Next Generation Network (NGN) in which a broadband transport network is used to augment a capacity of the circuit-switched telephone network illustrated in FIG. 1, and methods in accordance with the invention for implementing LNP.

As shown in FIG. 2, when a circuit-switched telephone network is augmented with a packet-switched broadband transport network, greater efficiencies may be realized by converting switches connected to the broadband transport network into a distributed switch using a distributed switch call manager (DSCM) 26, connected to the broadband transport network 28. Each DSCM 26 is responsible for call control messaging for calls placed to, and from, directory numbers serviced by one or more exchange(s). In a shift toward packet-switched, broadband transport networks, the circuit-switched bearer network 18 of the PSTN is being augmented by broadband transport networks (BTNs) 28, such as ATM and managed IP networks. To accommodate this shift, switch fabrics are being connected to the BTNs using media gateways (MGs) 32. Line gateways (LGs) 33, which include a switch fabric, and support user devices directly, are also being connected to the BTN 28.

When TDM switches are converted to distributed switches, the switch fabric 34, and most peripherals are not replaced. At least one MG 32 is added to the TDM switch, and the CM (not shown) is decommissioned. This conversion of telephone service switches involves providing a signaling path 36 between each MG 32 and the DSCM 26.

A DSCM has access to a directory number translation table 27 which it uses to route call control messages to components of the TDM switches in Central Offices 10. A DSCM 26 may retrieve from its translation table 27 an identifier of a signaling path for each directory number in its service area. The DSCM 26 has signaling interfaces with a common channel signaling (CCS) network 20 and the BTN 28. The DSCM 26 therefore exchanges Integrated Services Digital Network-User Part (ISUP)+(also referenced as "Bearer Independent Connection Control (BICC)) and Transaction Capability-Application Part (TCAP) signaling on the CCS network 20. The DSCM 26 also exchanges control messages with components of the TDM switches using the signaling paths 36a, 36b through the BTN 28.

A first method for enabling the porting of directory numbers is provided for subscribers served by the DSCM 26 shown in FIG. 2. The invention enables any directory number served by the DSCM 26 to be ported to any other location within the service area of the DSCM 26. This may be accomplished in one of two ways. For example, a subscriber having a directory number 423-1234 connected to line interface 22b of a Central Office 10b may be ported to a line interface 22a of a Central Office 10a controlled by the DSCM 26. In order to effect this first method of local number portability, the only change required is an adjustment to the number translation tables 27 of the DSCM 26, to associate the ported number with a signaling path 36a used for call control messaging between the DSCM 26 and the MG 32a. Once this adjustment has been effected, ported service may commence and service features are ported without interruption or re-provisioning, or loss of continuity.

As will be understood by those skilled in the art, the area in which local number portability is enabled may be enlarged by adding Central Offices 10 to the calling area served by the DSCM 26. Central Offices 10 may be added to the calling area by replacing at least one digital trunk controller (DTC) 30 of each Central Office with an MG 32, and decommissioning the control module (CM) of the Central Office 10. Thereafter, a signaling path 36 must be provisioned through the BTN 28 to each MG 32 added to the network. Number translation table 27 in the DSCM 26 must also be augmented to include directory numbers served by each Central Office 10 added to the local calling area controlled by the DSCM 26.

As will also be understood by those skilled in the art, local number portability may be enabled in a local calling area by decommissioning the control modules of selected Central Offices in the local calling area and replacing the functionality of the decommissioned control modules with a DSCM 26. The Central Offices consolidated into a distributed switch may be selected on the basis of predicted demand for local number portability. It should be noted that Central Offices 10 controlled by a DSCM 26 need not be geographically co-located. However, due to inherent restrictions in the North American Numbering Plan (NANP), number portability cannot be practically extended beyond the boundaries of a Number Plan Area Code, as is well understood by persons skilled in the art.

As shown in FIG. 2, a second method of porting numbers within the calling area served by the DSCM 26 is to use a line gateway 33 to serve ported numbers. If this option is selected, the line gateway 33 is provisioned in an area to which the number is to be ported and a subscriber line for serving the ported number is connected to the line gateway. A signaling path 36c is provisioned through the BTN 28 to permit the DSCM 26 to control the line gateway 33 by sending and receiving call control messages via the signaling path 36a. Once the line gateway 33 is installed and provisioned, any directory number served by the DSCM 26 may be ported to the line gateway 33.

Figure 3:
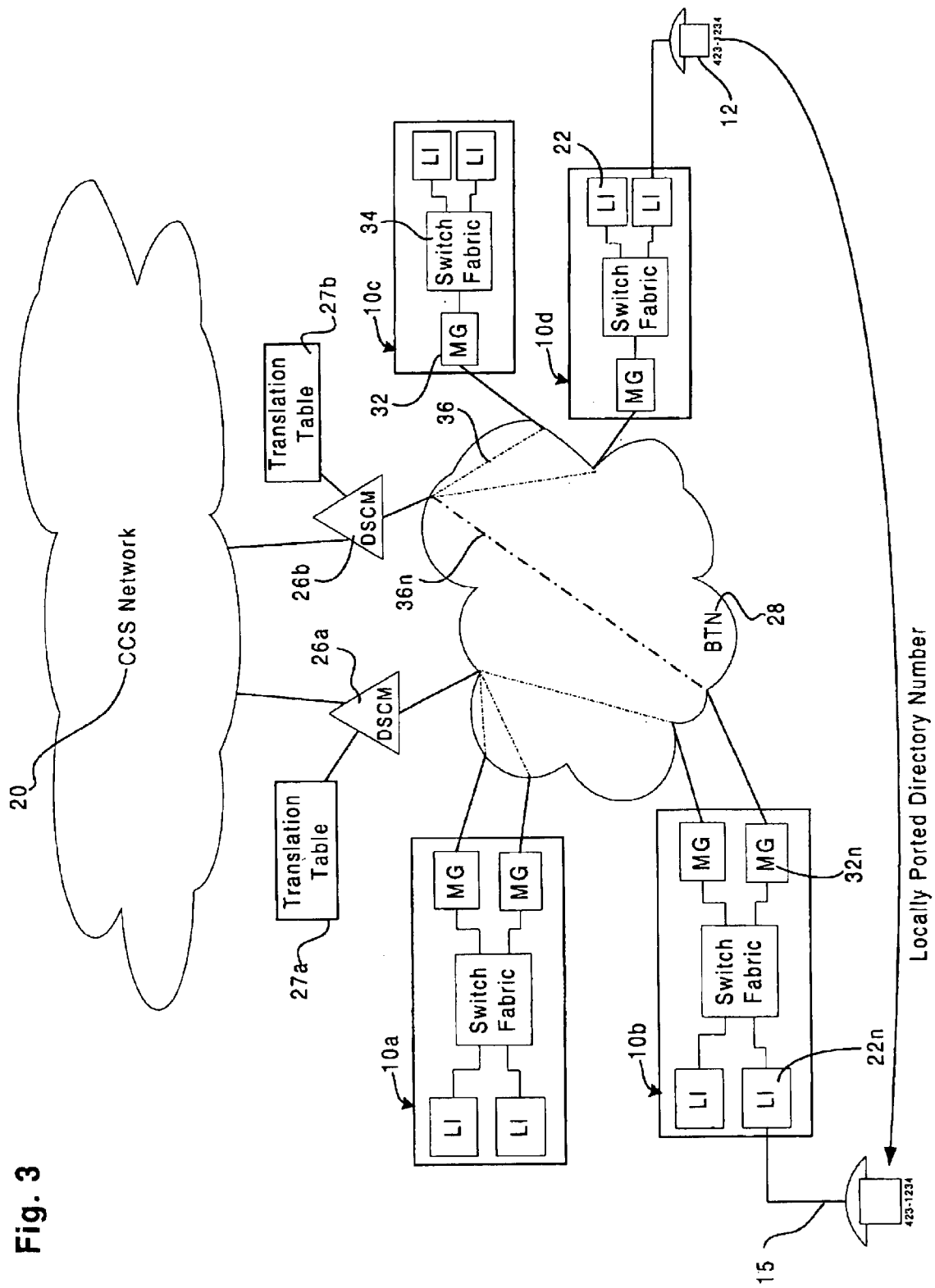
FIG. 3 illustrates a method for implementing LNP when a number is ported from an area served by one distributed switch to an area served by another distributed switch.

FIG. 3 illustrates a method by which local number portability is enabled across local calling areas served by two or more DSCMs 26. In the example shown, a DSCM 26a controls Central Offices 10a, 10b while a second DSCM 26b controls Central Offices 10c, 10d. A subscriber having a directory number 423–1234 desires to be ported to an area served by Central Office 10b. This may be accomplished, in a first example, by provisioning a new media gateway 32n at the Central Office 10b and provisioning a signaling path 36n through the BTN 28 between the DSCM 26b and the media gateway 32n. Thereafter, a line interface 22n is provisioned at the Central Office 10b to serve the ported number 423–1234. As will be understood by those skilled in the art, the number translation table 27b in the DSCM 26b must be updated so that the ported number is associated with the signaling path 36n. As will also be understood by those skilled in the art, service features subscribed to by the subscriber having ported number 432–134 are transparently ported without interruption or re-provisioning. Consequently, there is no loss of continuity in the service and historical data such as saved voice mail messages and other service-related profiles and criteria remain intact without transfer or re-provisioning.

Figure 4:
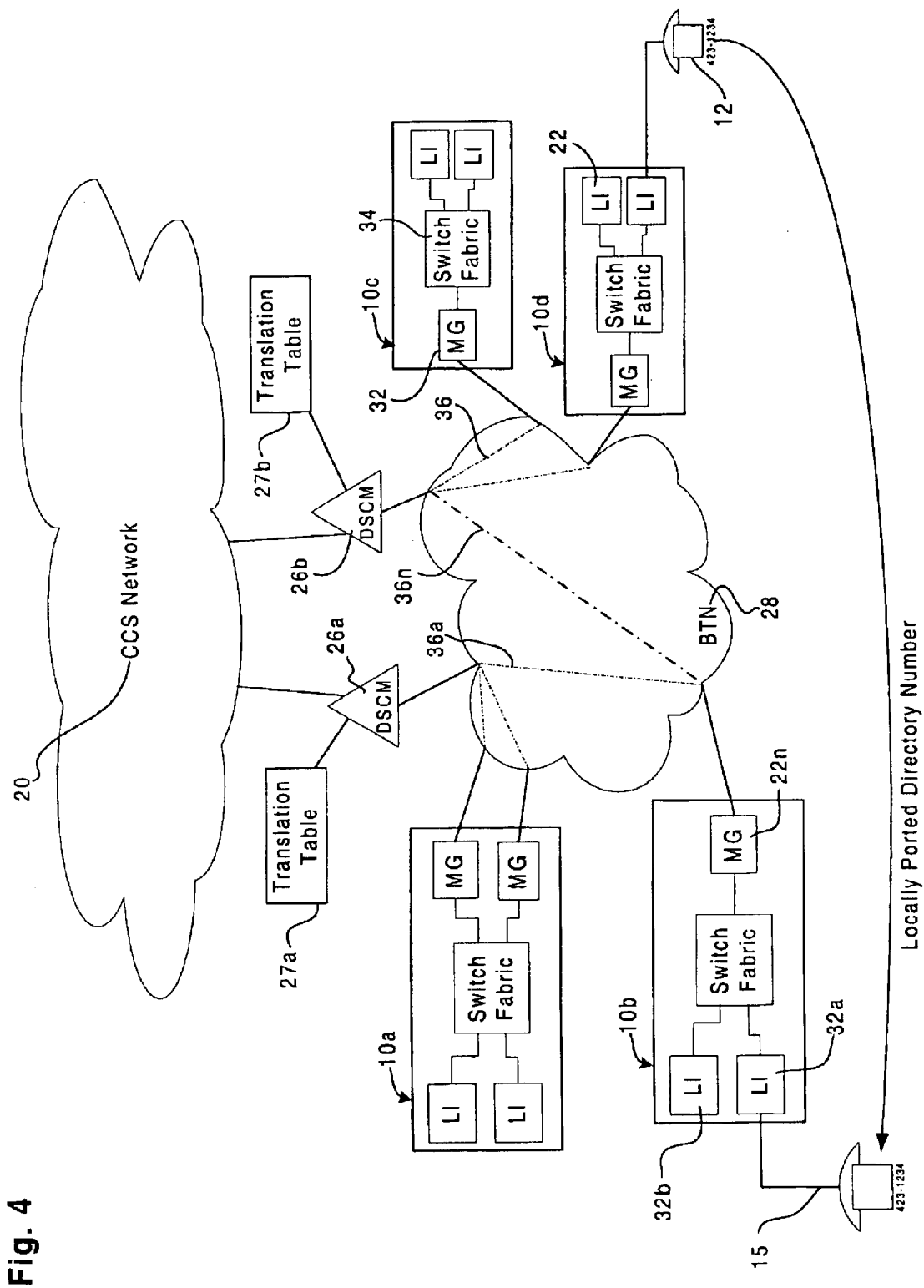
FIG. 4 illustrates a method in accordance with the invention that leverages capabilities of a second generation media gateway (MG)

FIG. 4 shows a second method of enabling the portability of a directory number to an area served by a DSCM 26a from an area served by a second DSCM 26b. This method is identical to the method described above with respect to FIG. 3, with the exception that a new type of media gateway 22n is introduced in the network. The new media gateway 22n is provisioned to differentiate directory numbers and to exchange call control messages with two or more DSCMs 26, depending on the directory number associated with any given call control message. In this example, a subscriber having the directory number 423–1234 is ported from Central Office 10d to Central Office 10b which is controlled by DSCM 26a. Porting the number is enabled by provisioning a new signaling path 36n through the BTN 28 between DSCM 26b and MG 22n which already has a signaling path 36a provisioned to the DSCM 26a. A line interface 32n is also provisioned and a subscriber line 15 is connected to the line interface to support the ported directory number. When a call is placed to the ported directory number 423–1234, call control messages are sent from the DSCM 26b over the signaling path 36n to the MG 22n and a translation table (not shown) in the MG 22n directs the control messages to the line interface 32n. When a call originates from the ported number, the line interface 32n formulates a signaling message which is sent through the switch fabric to the MG 22n. The MG 22n is enabled, as described above, to differentiate subscriber equipment numbers and directs the message over signaling path 36n to the DSCM 26b. This new type of MG 22n therefore simplifies provisioning for local number portability and reduces equipment cost. Local number portability in either direction can be enabled in the network configuration shown in FIG. 4, if each of the MGs 32 are provisioned with the capacity to discriminate directory numbers and to communicate with two or more DSCMs 26.

Figure 5:
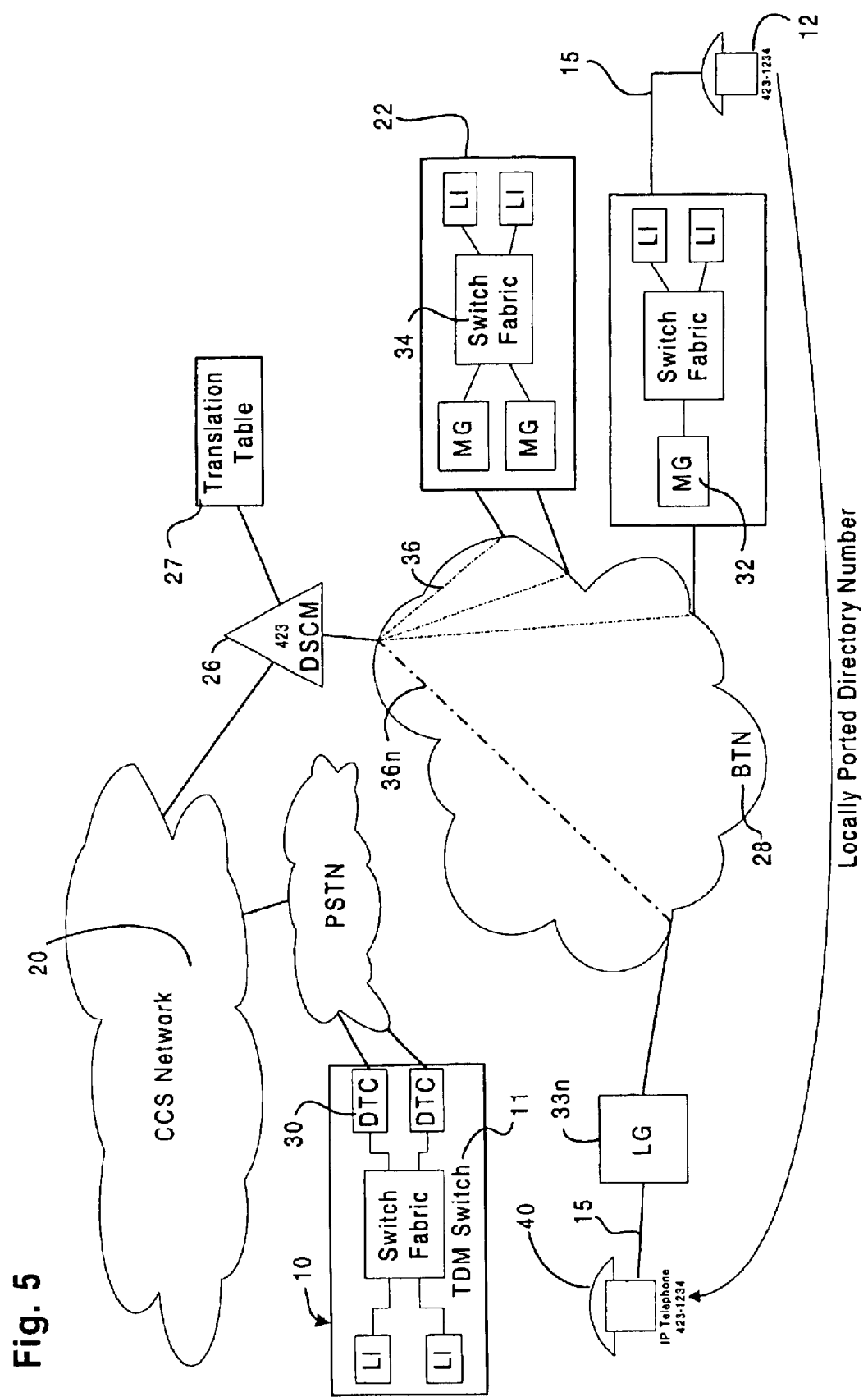
FIG. 5 illustrates a method in accordance with the invention in which a line gateway is used to provide LNP.

FIG. 5 illustrates a further embodiment of the invention in which a line gateway 33n is used to provide local number portability. Use of the line gateway 33n, which includes a switch fabric and supports subscriber lines directly, enables a number to be ported from a distributed switch controlled by DSCM 26 to an area served by a Central Office 10, which is not connected to the BTN 28. Local number portability is enabled by provisioning the line gateway 33n in the area where the subscriber wishes the local number to be ported. A signaling path 36n is provisioned through the BTN between the DSCM 26 and the line gateway 33n. A subscriber line 15 is provisioned between the line gateway 33n and the subscriber telephone 40 which, may be, an Internet Protocol (IP) or an Asynchronous Transfer Mode (ATM) device, for example. Of course, the telephone 40 may also be a standard telephone device the line gateway 33n may support standard telephone equipment. The method shown in FIG. 5 permits number portability without converting the Central Office 10, which services the area to which the directory number is ported, to a distributed switch controlled by the DSCM 26.

As will be understood by those skilled in the art, the invention therefore provides a plurality of innovative ways of enabling local number portability in a local toll telephone service area. A significant advantage of the method is that it enables a seamless and transparent porting of subscriber services without loss of continuity or re-provisioning. The invention therefore represents a significant advance in the art of providing local number portability.

The embodiments of the invention described above are intended to be exemplary only. The scope of the invention is therefore limited solely by the scope of the appended claims.

We claim:

1. A method of porting a directory number within a local telephone service area served by a distributed switch call manager (DSCM), comprising the steps of:
    a) selecting at least one of a media gateway (MG) and a line gateway (LG) through which to serve the ported directory number,
    b) re-provisioning the DSCM to address call control messages associated with the ported directory number to the at least one of the MG and the LG by changing a number translation table in the DSCM to associate the ported directory number with a signaling path to the at least one of the MG and the LG.

2. A method of expanding an area for local number portability in which directory numbers, served by first and second distributed switch call managers (DSCMs) of a broadband transport network (BTN), are ported from the first to the second DSCM, comprising a step of establishing a signaling path through the BTN from the first DSCM to one of a media gateway (MG) and a line gateway (LG) located in an area served by the second DSCM, wherein the one of the MG and the LG is used to provide service to subscribers having directory numbers ported to the area served by the second DSCM.

3. A method as claimed in claim 2, further comprising a step of changing number translation tables in the first DSCM to associate the ported number with the one of the MG and the LG.

4. A method as claimed in claim 2, wherein the at least one of the MG and the LG is enabled to exchange control messages with more than one DSCM.

5. A method as claimed in claim 2, further comprising a step of provisioning the at least one of the MG and the LG to exchange control messages with more than one DSCM.

6. A method of porting a directory number of a telephone service subscriber whose directory number is served by a distributed switch call manager (DSCM) of a broadband transport network (BTN), comprising steps of:
 a) provisioning a line gateway (LG) to exchange signaling messages with the DSCM;
 b) provisioning a subscriber line between the LG and the subscriber's ported location;
 c) provisioning the DSCM to direct call control messaging associated with the subscriber's directory number to the LG;
 d) establishing a signaling path through the BTN between the DSCM and the LG; and
 e) provisioning the LG to send call control messages over the signaling path to the DSCM.

7. A method as claimed in claim 6, wherein the step of provisioning the DSCM comprises a step of changing directory number translation tables in the DSCM so that directory numbers ported to the LG are associated with a signaling path through the BTN to the LG.

8. A method of porting a directory number and all service features associated with a telephone service subscriber whose directory number is served by a first distributed switch call manager (DSCM) of a broadband transport network (BTN) to a subscriber line in an area served by a second DSCM of the BTN, comprising steps of:
 a) provisioning a line interface (LI) at a service switching point to which the directory number is to be ported and connecting a subscriber line for the ported directory number to the line interface;
 b) provisioning a signaling path from the first DSCM to the LI through a media gateway (MG) connected to the service switching point; and
 c) provisioning the first DSCM to use the signaling path for call control messaging associated with the directory number to be ported.

9. A method as claimed in claim 8, wherein the step of provisioning the signaling path comprises a step of selecting an MG adapted to route call control messages to more than one DSCM.

10. A method as claimed in claim 8, wherein the step of provisioning the signaling path comprises a step of changing a number translation table in the DSCM to associate the ported number with the signaling path.

11. A method of enabling local number and service feature portability within a telephone service area served by at least two central offices (COs) having respective control modules (CMs), comprising steps of:
 a) decommissioning each of the CMs and installing a distributed switch call manager (DSCM) connected to a broadband transport network (BTN);
 b) provisioning the DSCM to control components of each of the at least two COs by routing control messages through media gateways (MGs) connected to the respective COs;
 c) porting a directory number served by one of the at least two COs, to a subscriber line served by another of the at least two COs by changing number translation tables in the DSCM used to direct call control messages to the CO to which the directory number is ported;
 d) establishing signaling paths through the BTN between the DSCM and the MGs of the respective COs; and
 e) provisioning the DSCM with a number translation table used to select signaling paths through which call control messages are transmitted for ported directory numbers.

12. A method as claimed in claim 11, wherein the at least two COs are selected in accordance with an expected demand for local number portability.

13. A method as claimed in claim 11, wherein an area in which the local number and service feature portability is enabled is enlarged, comprising steps of:
 a) decommissioning another CM in of another Central Office (CO) in the local telephone service area; and
 b) provisioning the DSCM to control components of the other CO by routing call control messages through media gateways connected to the other CO.

* * * * *